United States Patent [19]

Oswald

[11] 4,068,805
[45] Jan. 17, 1978

[54] SHREDDING MACHINE

[76] Inventor: Fred Oswald, Forest Drive, Sands Point, N.Y. 11050

[21] Appl. No.: 739,268

[22] Filed: Nov. 5, 1976

[51] Int. Cl.² ............................................. B02C 19/00
[52] U.S. Cl. .................................... 241/159; 241/166; 241/236
[58] Field of Search ............... 241/158, 159, 160, 166, 241/236, 152 R, 155, 157, 167; 83/35

[56] References Cited

U.S. PATENT DOCUMENTS

| | | | |
|---|---|---|---|
| 1,340,225 | 5/1920 | Howard | 83/35 |
| 2,121,453 | 6/1938 | Sundstrand | 241/236 |
| 3,089,409 | 5/1963 | Tretheway et al. | 241/236 |
| 3,620,461 | 11/1971 | Pelleschi et al. | 241/152 A |
| 3,894,697 | 7/1975 | Lawson et al. | 241/236 |
| 3,921,920 | 11/1975 | Brocard | 241/236 |
| 4,000,748 | 1/1977 | Summers | 241/236 |

Primary Examiner—Granville Y. Custer, Jr.
Attorney, Agent, or Firm—Alan K. Roberts

[57] ABSTRACT

Two pairs of interdigitated rotatable members are arranged at right angles to one another and are connected by a chute leading downwardly away from one of the pairs and transversely to the other of the pairs so that paper can be first cut up into strips and then subsequently recut to form a confetti. The rotatable members are formed of spools coaxially mounted on a drive shaft, each of the spools being formed of circular or cylindrical members with lesser diameter portions therebetween for purposes of spacing. A comb is provided in association with at least one of the rotatable members and is provided with extra tongues accommodated in grooves formed on the rotatable members in order to strip paper therefrom in order to prevent the paper from becoming entangled in the rotatable members and jamming the same.

15 Claims, 6 Drawing Figures

U.S. Patent   Jan. 17, 1978   Sheet 1 of 2   4,068,805
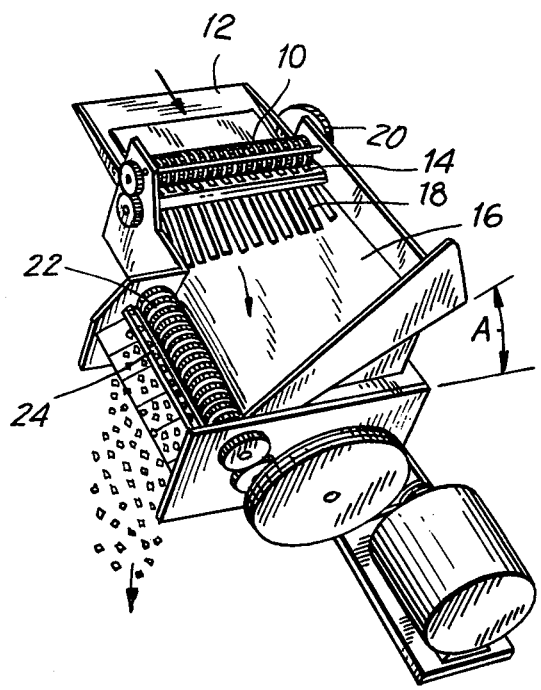
FIG. 1
FIG. 2
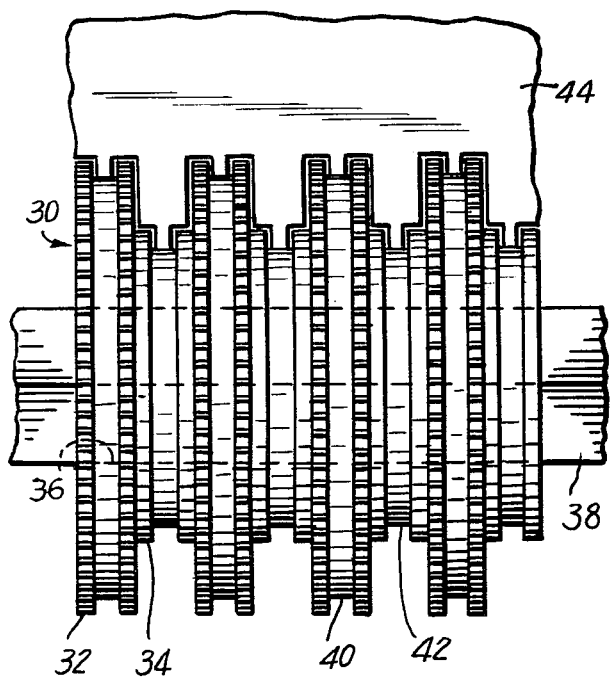
FIG. 3
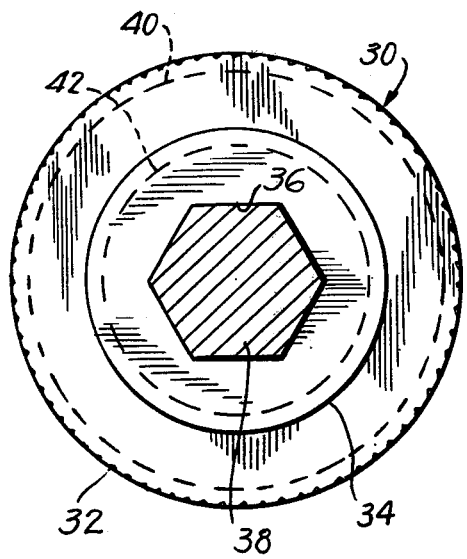

SHREDDING MACHINE

FIELD OF THE INVENTION

The invention relates to shredding machines and, more particularly, to apparatus for shredding documents and the like.

BACKGROUND OF THE INVENTION

One way of destroying documents to preserve the confidentiality thereof is to cut the same into narrow strips in a process known commonly as shredding. A specific known way of shredding is achieved with circular knives with a number of circular knives and spacers being stacked on a shaft and drawn together with two such stacked shafts being meshed together in order to form a cutting head. Paper guides or combs are used to guide the paper into the cutting heads and to lead the paper out for purposes of discharge. A very significant problem which occurs with this general type of apparatus is that pieces of paper get caught between the meshing rotating members or between the combs and one of the rotating members, whereby the machinery is jammed and sometimes irreparably damaged.

U.S. Pat. No. 2,554,114 shows one type of shredding machine in which interdigitated circular cutting members are employed. This equipment is generally of the type described above and is susceptible of being jammed by the trapping of paper pieces therein.

U.S. Pat. No. 2,894,697 (M. H. Panning et al) also shows a shredder in which rotating members are provided with interdigitated cutting elements which are also susceptible of being jammed by paper pieces being trapped therein.

U.S. Pat. No. 3,396,914 (A. J. Liebman) also shows a machine for disintegrating paper and other waste materials. The machine uses interdigitated rotatable cutting members which may also be jammed in the manner referred to hereinabove.

SUMMARY OF THE INVENTION

It is an object of the invention to provide improved shredding apparatus.

It is a further object of the invention to provide improved equipment suitable for shredding confidential documents and the like.

It is a further object of the invention to provide improved equipment for avoiding the deficiences of previously known equipment and, more specifically, apparatus which is capable of operating free from the jamming problems characteristic of previously known equipment.

To achieve the above and other objects of the invention, there is provided a paper shredder comprising interdigitated rotatable members, each including alternating first and second portions of different diameter, said members being adapted to shred paper therebetween, and comb means operatively extending into at least one of said members to strip paper therefrom, the said comb means and one of said members cooperatively including tongue and groove means to assist in removing paper from the members whereby to prevent jamming of said shredder.

According to a constructional feature of the invention, the aforesaid first and second portions are cylindrical sections provided with angular grooves constituting part of said tongue and groove means.

According to another feature, said comb means includes tines respectively extending between said first portions towards said second portions and tongues on said tines extending into the grooves in the second portions.

According to a further feature of the invention, said comb means may include tongues between said tines extending into the grooves in said first portions.

According to another aspect of the invention, the rotatable members are each inclusive of a plurality of coaxial sections or spools, each including a plurality of first and second portions. The rotatable members may include respective drive shafts rotatably coupled to respective of the coaxial section, said coaxial sections being interengaged to retain the same on the shafts.

According to a further constructional feature of the invention, the first portions may be knurled, and thereby include serrated edges.

The aforesaid comb means may include a sheet metal part including two angularly related and connected sections, one of which includes the aforesaid tines.

According to a further constructional feature of the invention, the tines may, in profile, be bounded by a planar and a curved surface.

According to another aspect of the invention, there may be provided a chute sloping downwardly and laterally of the first said rotatable members and second interdigitated rotatable members at right angles to the first said rotatable members to receive shredded paper from the chute for reshredding the same.

According to a specific feature of the invention, the chute may incline at an angle of 5°–15° towards the second said rotatable members and at an angle of 20°–40° away from the first said rotatable members.

According to another aspect of the invention, a paper shredder is provided which comprises two pairs of interdigitated cutting members, one of said pairs being angularly related to the other of said pairs, and chute means being provided for delivering paper from one pair to the other while retaining a generally constant attitude of the paper so that the paper can be cut in two directions.

The cutting members include spaced and knurled cutting wheels and the wheels may be arranged as spools which are, in turn, arranged in coaxial relationship. The chute means, as noted above, provides a low friction surface sloping at an angle of 20°–40° downwardly away from one of said pairs and at an angle of 5°–15° towards the other of said pairs.

The above and further objects and features of the invention will be apparent from the detailed description which follows hereinafter, as illustrated in the accompanying drawing.

BRIEF DESCRIPTION OF THE DRAWING

In the drawing:

FIG. 1 is a perspective view illustrating two pairs of interdigitated rotatable members coupled through the intermediary of a chute, as provided in accordance with the invention;

FIG. 2 is a side view of a spool employed in the cutting member employed in accordance with the invention, this view showing a broken away portion of a comb cooperatively engaged therewith;

FIG. 3 is an end view of the spool illustrated in FIG. 2;

DETAILED DESCRIPTION

Figure 4:
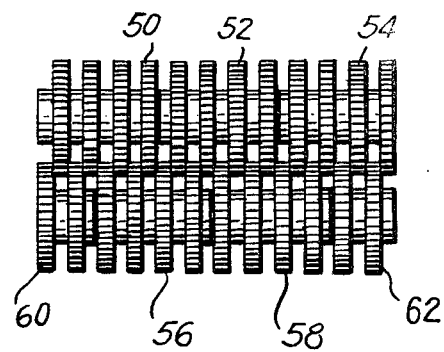
FIG. 4 is a diagrammatic illustration of the interconnection between the various spools mounted on two parallel shafts.

As has been indicated hereinabove, the invention provides a paper shredder for the shredding of documents and the like, which comprises two pairs of interdigitated cutting members, one of said pairs being angularly related to the other of said pairs, and chute means delivering paper from one pair to the other while retaining a generally constant attitude of the paper so that the paper can be cut in two directions.

In FIG. 1 is illustrated a pair of cutting members 10 into which paper is fed via a guide 12. A comb 14 engages in one of the cutting members in order to strip paper therefrom and guide the same onto a chute 16, the paper emerging from the first set of cutters being generally indicated at 18. A drive for the cutting members 10 is indicated generally at 20 and may be powered, for example, by an electric motor (not shown).

A second pair of cutting members is indicated at 22 and may be fashioned, generally, in the same manner as the first pair of cutting members. It has a comb 24 associated therewith to operate in the same manner as the comb 14 to strip paper from the cutting members 22.

The chute 16 slopes downwardly away from the cutting members 10 at an angle of preferably 30°, but generally within the range of 20°-40°. The chute 16 slopes laterally at an angle of an angle A of preferably 10°, but generally preferably within the range of 5°-15°. The purpose of the chute 16 is to maintain a substantially constant attitude of the paper strips emerging from cutters 10 so that they slide downwardly towards cutting members 22 to be reshred from paper strips into the form of confetti. The angular disposition of the upper surface of chute 16 will, generally, provide for retaining the paper in constant attitude. For this purpose, the upper surface may preferably be of polished or plated metal or may have a plastic coating, such as Teflon, thereon.

According to the prior art, one of the problems encountered by shredding apparatus is that the paper strips indicated at 18 tend to wind around the wheels and become compacted and jam between the rotating cutting members or between the cutting members and the associated comb, thereby jamming the machine so that it has to be stripped down in entirety or such that the machine is sometimes irreparably damaged. It is this objectionable occurrence which the invention avoids by the provision of specialized cutting members and combs as will be further described hereinbelow with respect to FIGS. 2 - 6.

Referring next to FIGS. 2 and 3, it is seen that the cutting members are provided in the form of a plurality of spools, one of which is generally indicated at 30, each spool being provided with a plurality of first portions 32 and a plurality of second portions 34, the portions 32 constituting cutting wheels and the portions 34 constituting spacers therebetween, into which penetrate the cutting wheels of the other of the pair of cutting members. It will be further seen that each spool is provided with a bore 36, preferably of hexagonal form and such that a shaft 38 may be rotatably coupled thereto in a generally keyed manner so that power can be transferred through the shaft 38 to the spools mounted thereon.

In accordance with the invention, each of the portions 32 is provided with an annular groove 40 and each of the portions of smaller diameter therebetween is provided with an annular groove 42.

FIG. 2 diagrammatically illustrates a portion 44 of a comb associated with the illustrated spool and cutting member. It will be generally noted at this point that the comb has a profile generally corresponding to the profile of the spool.

Before a detailed discussion of the comb and its relationship with the spool is given, attention is next directed to FIG. 4 wherein are shown a plurality of spools 50, 52 and 54 on the one hand, coaxially mounted on one rotatable shaft, whereas spools 56 and 58 are illustrated as being mounted on a second parallel shaft with half spools 60 and 62 completing the axial extent of the lower most of the shafts. The cutting wheels of the respective spools are shown in interdigitated relationship, the cutting wheels on one set of spools extending between the cutting wheels on the spools on the other shaft. It will be appreciated that, due to the interdigitated relationship of the cutting wheels of the respective spools, they all cooperate to form an interlocking relationship with the spool arrangement being sandwiched between the end gears and the drive members mounted on the shafts for purposes of driving the respective rotating shafts.

The peripheries of the cutting wheels on the various spools are preferably knurled, thereby providing serrated edges in order to better grasp the paper to be shredded and draw the same between the paired rotatable cutting members.

Figure 5:
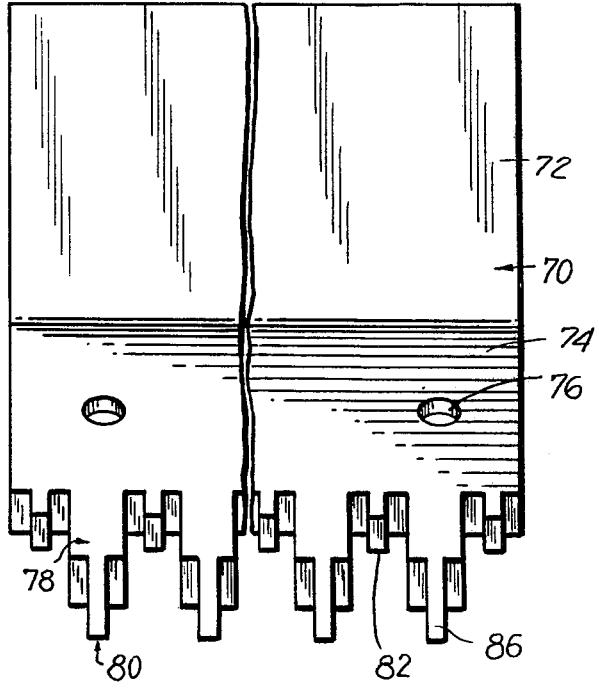
FIG. 5 is a partially broken away plan view of a comb employed in accordance with the invention.
Figure 6:
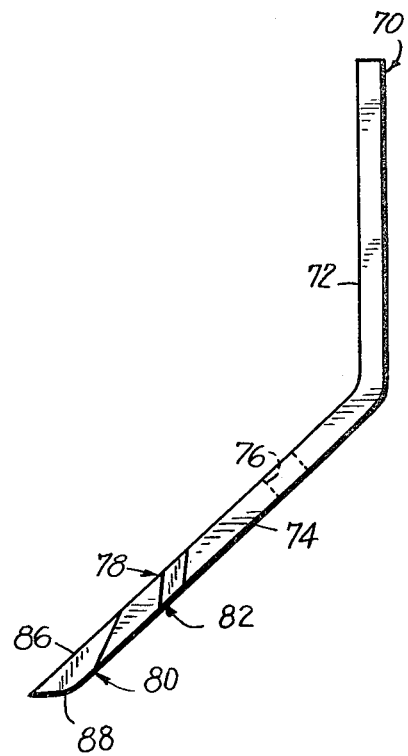
FIG. 6 is an end view of the comb illustrated in FIG. 5.

FIGS. 5 and 6 show exemplary comb structural features employed in accordance with the invention. These figures particularly show a comb member 70 formed of sheet metal or the like and including two angularly related sections 72 and 74. Section 74 is utilized for purposes of mounting and for this purpose may be provided with holes, such as indicated at 76, for accommodating mounting bolts or the like. The comb structure is provided with a plurality of tines 78 adapted for extending between the cutting elements of a spool. Each tine is additionally provided with a tongue 80 provided in accordance with the invention and adapted for extending into an annular groove 42 (see for example FIG. 2).

Between the tines 78, are provided a plurality of additional tongues 82. These latter tongues are adapted to extend into the annular grooves 40 provided in the outer peripheries of the respective circular cutting elements.

The tongues 80 are bounded in accordance with the invention with a planar surface 86 on the one hand and with a curved surface 88 on the other side. This enables a better tangential approach to the periphery of the smaller diameter portions 34 constituting the spaces between the circular cutting elements while, at the same time, better adapting the tongues for performing the function to be described hereinafter.

The specific function of the tongues 80 cooperating with the grooves 42, as well as the cooperation between tongues 82 and grooves 40, is to strip paper from the cutting elements and, thereby, prevent jamming of the paper between the cutting elements to the detriment of the operation of the equipment. How this is achieved may perhaps best be demonstrated by analogy. For example, if one were to visualize trying to lift a sheet of paper off the floor with a shovel, it will be readily appreciated that close contact between the shovel edge and floor may be necessary among other things to allow driving the shovel between the paper and the floor. On the other hand, if the floor were to be provided with a plurality of grooves and if the shovel were to be provided with a plurality of tongues in the manner as has been described hereinabove, the function of lifting the paper off the floor will be immeasurably facilitated. In the instant apparatus, the function is generally the same. The tongues penetrate into the annular grooves cooperatively related thereto and permit the tongues to lift the paper onto the respective tines or onto the comb body, thereby stripping the paper from the spools or rotatable cutting elements and preventing jamming of the paper between the rotatable cutting elements.

From what has been stated hereinabove and with reference again to FIG. 1, it will be appreciated that, in accordance with the invention, paper is guided between a first set of rotating cutting elements, whereby the paper is cut into strips, with these strips being prevented from wrapping around the cutting elements by operation of the tongue and groove combinations described hereinabove. These strips pass on to the chute provided for the purpose and move downwardly away from the first cutting elements and transversely thereof to be received by a second pair of cutting elements which shred the paper again, this time into confetti. The paper is, thus, cut in two directions. Furthermore, the paper is prevented from wrapping around the cutting elements by reason of the constructional feature referred to hereinabove.

There will now be obvious to those skilled in the art, many modifications and variations of the apparatus set forth hereinabove. These modifications and variations will not depart from the scope of the invention is defined by the following claims.

What is claimed is:

1. A paper shredder comprising interdigitated rotatable members each including alternating first and second portions of different diameter, said members being adapted to shred paper therebetween, and comb means operatively extending into at least one of said members to strip paper therefrom, the said comb means and the said one of said members cooperatively including tongue and groove means to assist in removing paper from the members whereby to prevent jamming of said shredder, the first and second portions being cylindrical sections of different diameters, each of said sections being provided with annular grooves constituting part of said tongue and groove means.

2. A paper shredder as claimed in claim 1 wherein said comb means includes tines respectively extending between said first portions towards said second portions and tongues on said tines extending into the grooves in the second portions.

3. A paper shredder as claimed in claim 2 wherein said comb means includes tongues between said tines extending into the grooves in said first portions.

4. A paper shredder as claimed in claim 3 wherein the rotatable members each include a plurality of coaxial sections each including a plurality of first and second portions.

5. A paper shredder as claimed in claim 4 wherein the rotatable members include respective drive shafts rotatively coupled to respective of the coaxial sections, said coaxial sections being interengaged to retain the same on the shafts.

6. A paper shredder as claimed in claim 2 wherein said first portions include serrated edges.

7. A paper shredder as claimed in claim 2 wherein said comb means includes a sheet metal part including two angularly related and connected sections, one of which includes said tines.

8. A paper shredder as claimed in claim 7 wherein said tines, in profile, are bounded by a planar and a curved surface.

9. A paper shredder as claimed in claim 1 wherein said first portions include serrated edges.

10. A paper shredder as claimed in claim 1 comprising a chute sloping downwardly and laterally of said rotatable members and second interdigitated rotatable members at right angles to the first said rotatable members to receive shredded paper from said chute for re-shredding the same.

11. A paper shredder as claimed in claim 10 wherein the chute inclines at an angle of 5°–15° towards the second said rotatable members and at an angle of 20°–40° away from the first said rotatable members.

12. A paper shredder comprising two pairs of interdigitated cutting members, one of said pairs being angularly related to the other of said pairs, and chute means to deliver paper from one pair to the other while retaining a generally constant attitude of the paper so that the paper can be cut in two directions.

13. A paper shredder as claimed in claim 12 wherein the said cutting members include spaced and knurled cutting wheels.

14. A paper shredder as claimed in claim 13 wherein said wheels are arranged as spools in turn arranged in coaxial relation.

15. A paper shredder as claimed in claim 12 wherein said chute means provides a low friction surface sloping at an angle of 20°–40° downwardly away from one of said pairs and at an angle of 5°–15° towards the other of said pairs.

* * * * *